US012793581B2

(12) United States Patent
Sampson et al.

(10) Patent No.: US 12,793,581 B2
(45) Date of Patent: Nov. 10, 2026

(54) MOCKUP ENGINE BLOCK AND KIT FOR ASSEMBLING SAME

(71) Applicant: ADVANCED RESOURCES, LLC, Wadsworth, OH (US)

(72) Inventors: Jordan Sampson, Richfield, OH (US); Brian Wendling, Strongsville, OH (US)

(73) Assignee: ADVANCED RESOURCES, LLC, Akron, OH (US)

( * ) Notice: Subject to any disclaimer, the term of this patent is extended or adjusted under 35 U.S.C. 154(b) by 387 days.

(21) Appl. No.: 18/541,672

(22) Filed: Dec. 15, 2023

(65) Prior Publication Data

US 2024/0203292 A1 Jun. 20, 2024

Related U.S. Application Data

(60) Provisional application No. 63/433,845, filed on Dec. 20, 2022.

(51) Int. Cl.
*G09B 25/02* (2006.01)

(52) U.S. Cl.
CPC .................................... *G09B 25/02* (2013.01)

(58) Field of Classification Search
CPC ...................................................... G09B 25/02
See application file for complete search history.

(56) References Cited

U.S. PATENT DOCUMENTS 4,204,358 A * 5/1980 Briggs .................. A63H 27/02 244/133
6,079,392 A * 6/2000 Matsuda ................ F02M 67/02 123/531
7,617,903 B2 * 11/2009 Byers .................. A63H 17/262 180/293
10,981,710 B1 * 4/2021 Pietrini ................ B65D 77/062
2003/0079706 A1 * 5/2003 Muehlbauer ............ F02N 11/12 123/179.25

OTHER PUBLICATIONS

Alfazer, "How to Make a Mini V8 Engine From Paper," 2018, Youtube.com, pp. 1-9, at https://www.youtube.com/watch?v=DnM6T2EbcmQ (last visited Mar. 3, 2026). (Year: 2018).*
"SoloSwap™ Chevy LS Mock Up Engine Swap Long-Block w/Heads, Long Block Version Weighs 35 Pounds, Includes Bolt-On Fabricated Steel Mock-Up Heads and Hardware for Assembly," Amazon, https://www.amazon.com/SoloSwapTM-Long-Block-Fabricated-Hardware-Assembly/dp/BOB7KKJ3JB, accessed Jul. 10, 2024, 6 pages.
Cruikshank, "SEMA 2022: Speedway Motors Debuts Chevy LS Mock-Up Block," Dragzine, Dec. 4, 2022, https://www.dragzine.com/features/sema-coverage/sema-2022-speedway-motors-debuts-chevy-ls-mock-up-block/, 5 pages.
"Replicate LS Engine Dimensions with an LS mockup block," Speedway Motors, https://www.youtube.com/watch?v=9qnbnsUS0iE, accessed Jul. 10, 2024, 2 pages.
Engine Jig LS/LT, https://web.archive.org/web/20210412184107/www.crossmembers.com/product/engine-jig/, accessed Sep. 13, 2024, 1 page.

* cited by examiner

*Primary Examiner* — Steve Rowland
(74) *Attorney, Agent, or Firm* — Vorys, Sater, Seymour and Pease LLP; Rex W. Miller, II

(57) ABSTRACT

The present disclosure relates to a mockup engine block and kit for assembling same.

23 Claims, 12 Drawing Sheets

MOCKUP ENGINE BLOCK AND KIT FOR ASSEMBLING SAME

CROSS REFERENCE TO RELATED APPLICATIONS

This application claims priority to and the benefit of U.S. Provisional Patent Application No. 63/433,845 filed 20 Dec. 2022, which is hereby incorporated by reference in its entirety.

FIELD OF THE DISCLOSURE

This disclosure relates generally to an engine block, and more particularly, to a dummy or replica engine block and a kit for assembling same.

BACKGROUND OF THE DISCLOSURE

An "engine swap" is a process of removing a vehicle's original engine and replacing the original engine with another. In many instances, engine swaps involve installation of a non-factory specification engine into a vehicle. Typically, an engine swap is implemented for performance reasons, e.g., replacing an original engine with a more powerful engine: however, engine swaps may also be implemented for maintenance reasons. In the case of older engines, there may be a shortage of replacement parts and so a modern replacement engine may be swapped because parts are more readily available and the vehicle may be easily maintained.

Fitting an engine into a vehicle that was not originally intended to accept it may require modifying the vehicle to fit the engine and/or building custom motor mounts and adaptors to interface with a frame/sub-frame/cross member and other components of the vehicle. Traditional methods for insuring fitment include connecting a swapped engine to a hoist and lowering the hoisted swapped engine into an engine bay of the vehicle. With the swapped engine in a desired location within the engine bay, measurements can be made for customizing the vehicle and fabricating motor mounts for ultimately determining how and where to secure the swapped engine to the vehicle. With measurements obtained, the hoisted swapped engine can be removed and the custom fabrication, based on the acquired measurements, completed. The swapped engine can be re-inserted and removed by hoist as desired.

Foam and plastic replica engine blocks, known as mockup engine blocks, are used as an alternative to traditional hoisted engine swaps and provide a different approach for ensuring fitment of an actual swapped engine based on the mockup engine block. The reduced weight of the replica engine block facilitates an engine swap process by removing a need to handle the actual swapped engine, taking away a risk of damaging an actual replacement engine and allowing for easier insertion in and out of vehicles. However, even plastic and foam engines have non-trivial weight. e.g., in excess of 20 pounds, in light of sharing a physical dimension with an actual engine, holding and maneuvering the replica engine may still come with difficulties. Furthermore, these foam/plastic replica engine blocks are also costly to manufacture.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In an example, a method of assembling a mockup engine block can include inserting a first set of tabs of respective cylinder extension walls through a first set of openings of a first face plate, inserting a second set of tabs of the respective cylinder extension walls through a second set of openings of a second face plate, locking the first and second set of tabs once inserted into corresponding openings of the first and second face plates, respectively, to form first and second cylinder heads of the mock engine block, inserting respective tabs of motor mount extensions through a second set of openings of each of the first and second face plates, locking the respective tabs of the motor mount extensions once inserted into respective openings of the first and second face plates, respectively, and securing a bottom face plate to the first and second face plates to assembly the mockup engine block.

In another example, a mockup engine block assembly kit can include a first set of cylinder extension walls, a second set of cylinder extension walls, and first and second face plates. The first and second set of cylinder extension walls can be configured to be secured between the first and second face plates to form respective first and second cylinder heads. The mockup engine block assembly kit can further include a set of motor mount extensions that can be configured to be secured between the first and second face plates, and a bottom face plate that can be configured to be secured to the first and second face plates.

In an even further example, a mockup engine block can include a first set of cylinder extension walls with tabs on respective ends that extend into a first set of openings of first and second face plates, respectively, and a second set of cylinder extension walls with tabs on respective ends that extend into a second set of openings of the first and second face plates, respectively. A portion of the tabs of the first and second set of cylinder extension walls can be perpendicular and contacting a surface of one of the first and second face plates. The mockup engine block can further include a set of motor mount extensions with tabs on respective ends that extend into a third set of openings of the first and second face plates, respectively. A portion of the tabs of the set of motor mount can be perpendicular and contacting the surface of one of the first and second face plates. The mockup engine block can further include a bottom face plate secured to the first and second face plates.

In yet in another example, a mockup automotive component assembly kit having physical dimensions corresponding to an actual automotive component can include first and second end plates and a plurality of side plates corresponding to aspects of said actual automotive component. The plurality of side plates can be configured to be secured to one of more end plates via a series of cooperating tabs and slots.

Any combinations of the various embodiments and implementations disclosed herein can be used in a further embodiment, consistent with the disclosure. These and other aspects and features are better appreciated according to the following description of certain embodiments presented herein in accordance with the disclosure and the accompanying drawings and claims.

DETAILED DESCRIPTION

Figure 1:
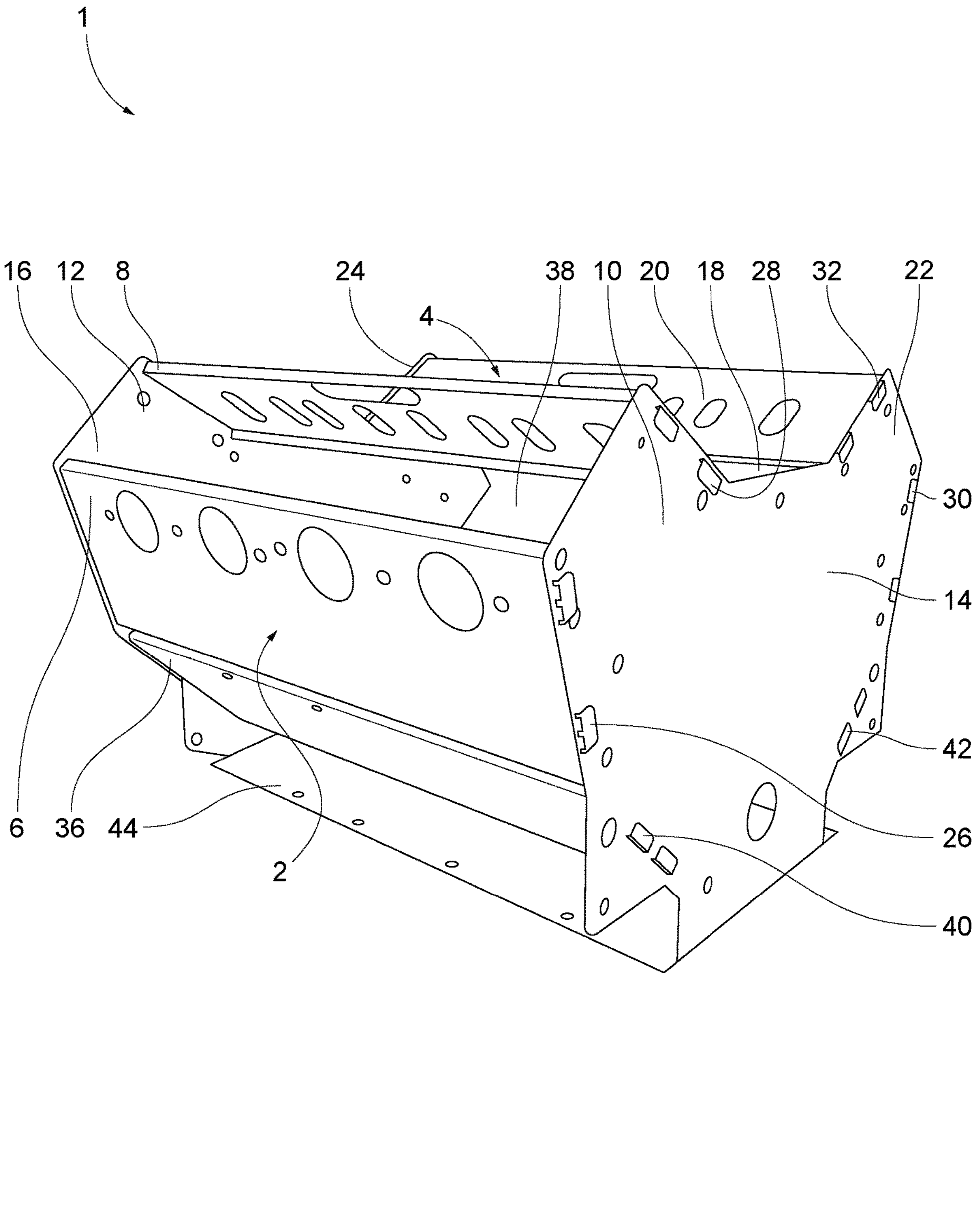
FIG. 1 is an example of a mockup engine block, according to one or more embodiments.
Figure 2:
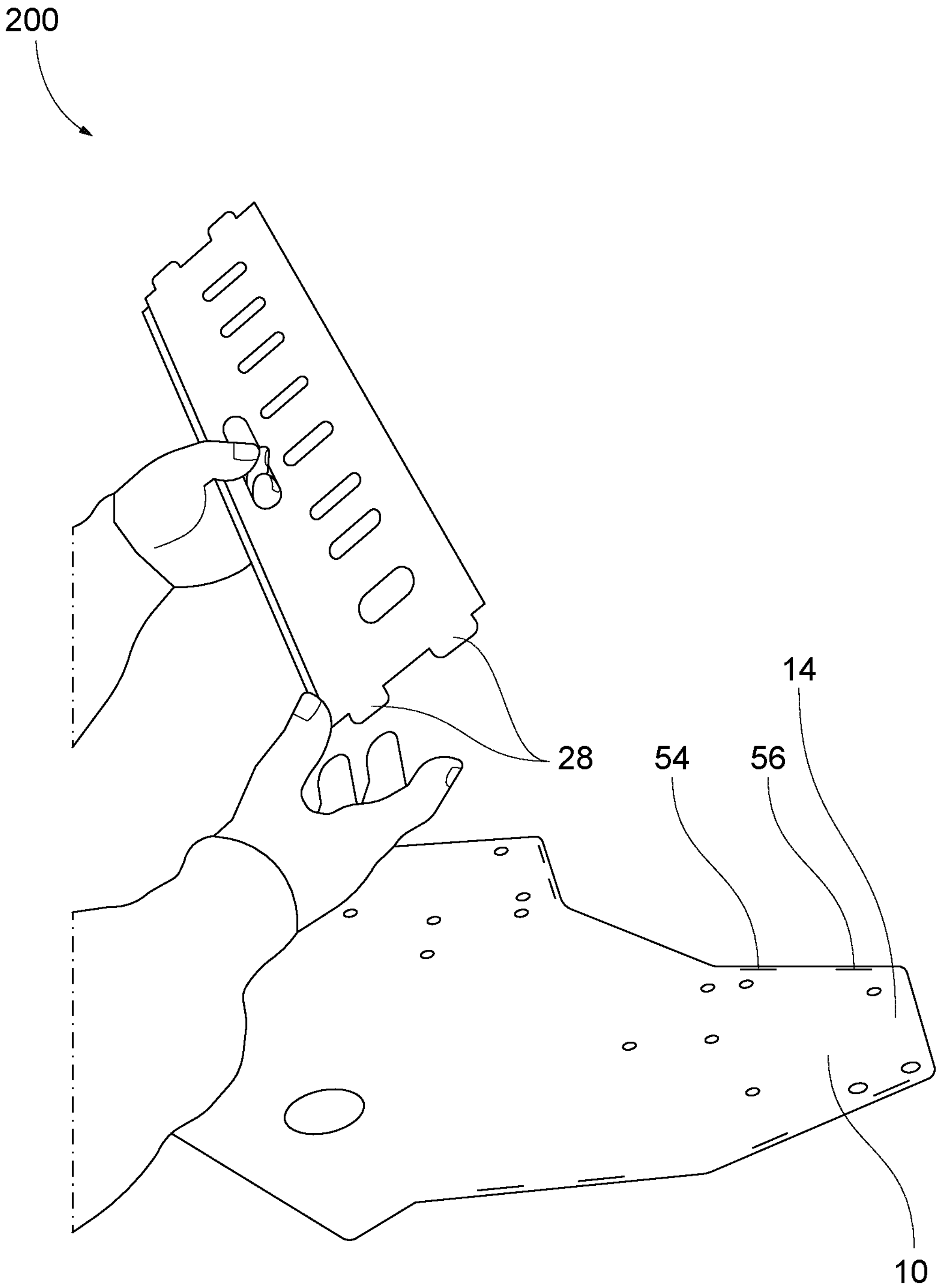
FIG. 2 illustrates a first step of a method of assembling the mockup engine block of FIG. 1, according to one or more embodiments.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to mockup engine blocks and a mockup engine block assembly kit. The mockup engine block as described herein is less costly to fabricate than existing replica engine blocks and require a reduced amount of time for assembly (e.g., in contrast to existing mock up engine blocks that use fasteners for assembly).

FIG. 1 is an example of a mockup engine block 1. The mockup engine block 1 includes cylinder heads 2 and 4, as shown in FIG. 1. As described herein, cylinder heads 2 and 4 are configured to extend between and be supported between a front face plate 14 and a rear face plate 16 of the mockup engine block 1. In the illustrated embodiment, the cylinder head 2 can be formed by a first set of cylinder extension walls 6 and 8, and first upper arm portions 10 and 12 of the front and rear face plates 14 and 16 of the mockup engine block 1. The cylinder head 4 can be formed in a similar manner as the cylinder head 2, as shown in FIG. 1. Thus, the cylinder head 4 can be formed by a second set of cylinder extension walls 18 and 20, and second upper arm portions 22 and 24 of the front and rear face plates 14 and 16 of the mockup engine block 1. In the illustrated embodiment, the front and rear face plates 14 and 16 having inner facing surfaces that face each other, and the first set of cylinder extension walls 6 and 8 and the second set of cylinder extension walls 18 and 20 are sized and oriented to extend between inner facing surfaces of the front and rear face plates 14 and 16. In the illustrated embodiment, the first set of cylinder extension walls 6 and 8 and the second set of cylinder extension walls 18 and 20 are directly connected to the front and rear face plates 14 and 16, but in other embodiments, may be indirectly connected to the front and rear face plates 14 and 16.

Figure 12:
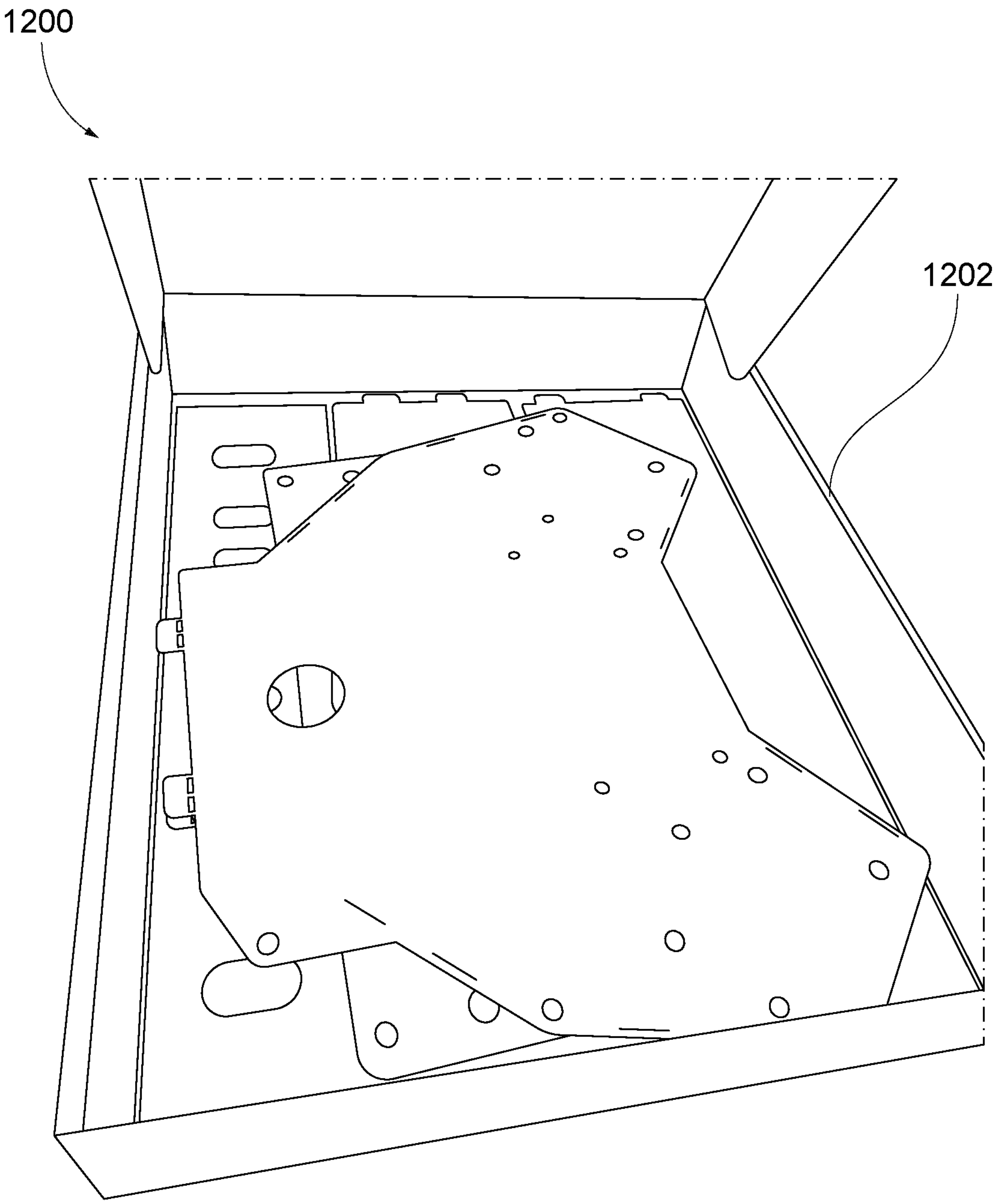
FIG. 12 is an example of the mockup engine block of FIG. 1 when dissembled and packaged in a carton.

For example, as described herein, the cylinder head 2 can be formed (e.g., during assembly of a dissembled version of the mockup engine block 1, for example, as shown in FIG. 12) by locking tabs 26 of the cylinder extension wall 6 and tabs 28 of the cylinder extension wall 8, once the tabs 26-28 are positioned through respective holes of the front and rear face plates 14 and 16. The cylinder head 4 can be formed by locking tabs 30 of the cylinder extension wall 18 and tabs 32 of the cylinder extension wall 20, once the tabs 30-32 are positioned through respective holes of the front and rear face plates 14-16. The locking of the tabs 26-28 and the tabs 30-32 secures (e.g., holds in place) the first and second set of cylinder extension walls 6-8 and 18-20, respectively, between the front and rear face plates 14-16 to define the corresponding cylinder heads 2-4, as shown in FIG. 1. It will be appreciated that the mockup engine block 1 is a representative of an actual engine and thus can have a different dimension and/or configurations, in other examples, to provide a replica for different engine designs (e.g., long and/or short engine blocks)

The mockup engine block 1 further includes motor mount extensions 36 and 38. The motor mount extensions 36 and 38 can be used for supporting the mockup engine block 1 inside an engine bay of a vehicle, for example, once situated therein. The motor mount extensions 36 and 38, like the first and second set of cylinder extension walls 6-8 and 18-20, can be supported between the front and rear face plates 14-16. In the illustrated embodiment, the motor mount extensions 36 and 38 are sized and oriented to extend between the inner facing surfaces of the front and rear face plates 14 and 16. In the illustrated embodiment, the motor mount extensions 36 and 38 are directly connected to the front and rear face plates 14 and 16, but in other embodiments, may be indirectly connected to the front and rear face plates 14 and 16. Respective tabs 40 and 42 of the motor mount extensions 36 and 38 can be positioned through respective holes of the front and rear face plates 14-16 and locked to secure the motor mount extensions 36-38, as shown in FIG. 1. The mockup engine block 1 further includes a bottom face plate 44 with openings 48 (not shown in FIG. 1: see FIG. 10) for receiving corresponding tabs 50 and 52 (not shown in FIG. 1: see FIG. 10) protruding from the front and rear face plates 14-16, respectively. The tabs 50-52 can be secured in a same or similar manner as the tabs 40-42 of the motor mount extensions 36-38, respectively. The locking of the tabs 50-52 secures (e.g., holds in place) the front and rear face plates 14-16 to the bottom face plate 44 and provides rigidity to the front and rear face plates 14-16.

FIGS. 2-11 depict an example method for assembling (e.g., putting together) the mockup engine block 1, as shown in FIG. 1, according to one or more embodiments. Thus, reference can be made to the example of FIG. 1 in the example of FIGS. 2-11. Like reference numerals are used in the example method, as shown FIGS. 2-11 for like features of the mockup engine block 1, as shown in FIG. 1. While, for purposes of simplicity of explanation, the example method of FIGS. 2-11 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

Figure 3:
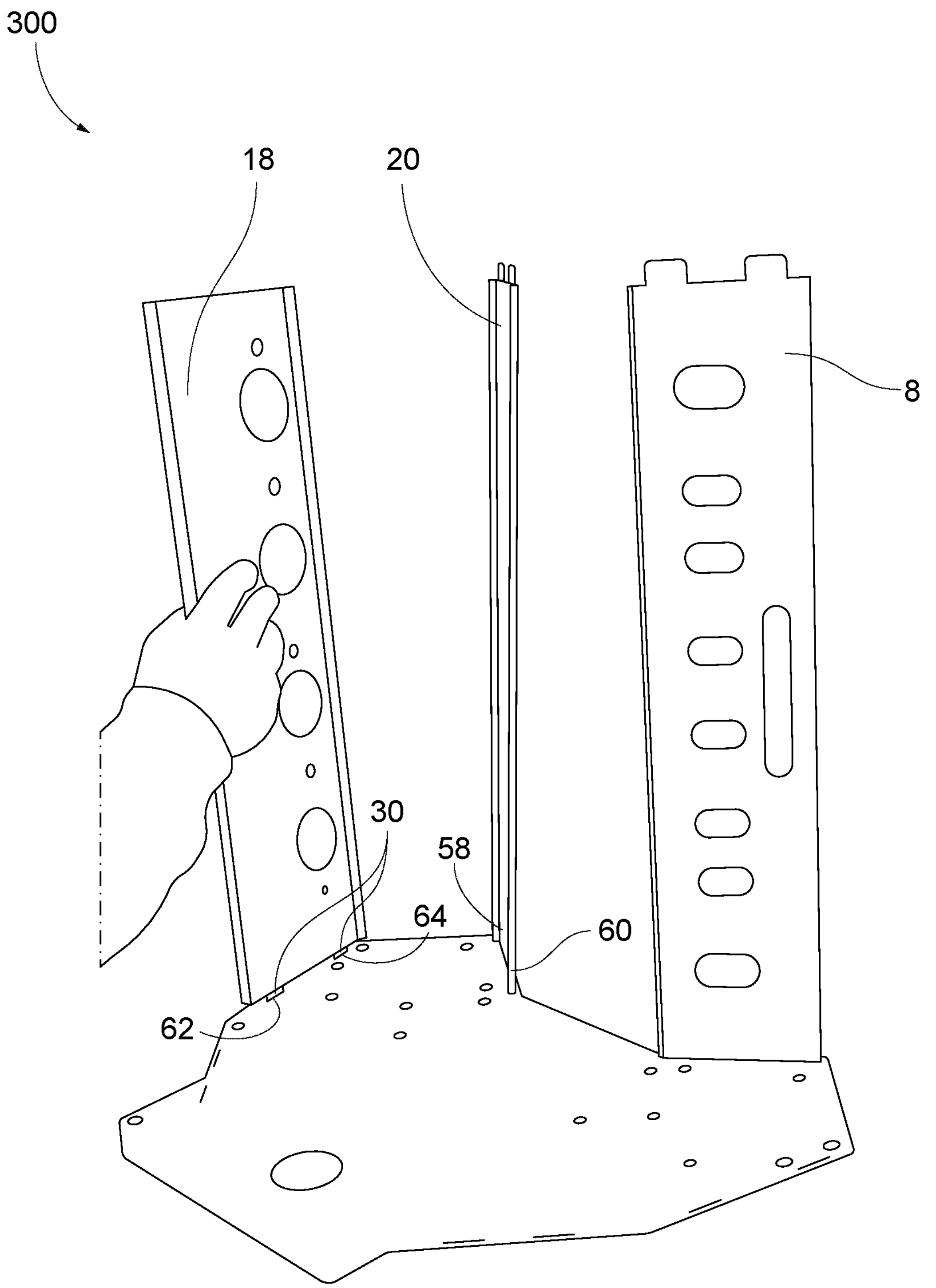
FIG. 3 illustrates a second step of the method of assembling the mockup engine block of FIG. 1, according to one or more embodiments.
Figure 4:
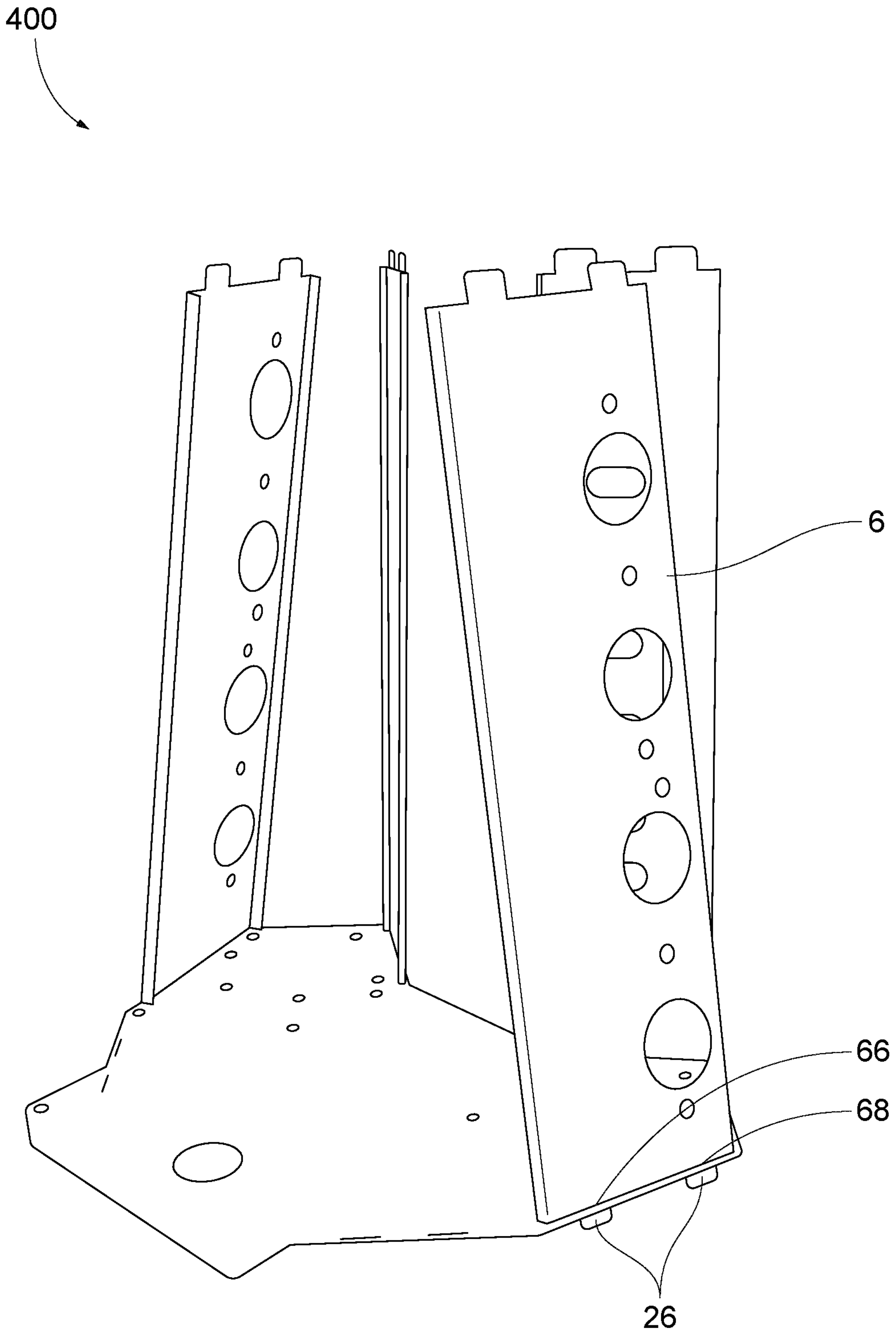
FIG. 4 illustrates a third step of the method of assembling the mockup engine block of FIG. 1, according to one or more embodiments.

For example, the method can begin at 200 by inserting supporting the first set of cylinder extension walls 6 and 8 between the front and rear face plates 14 and 16, and supporting the second set of cylinder extension walls 18 and 20 between the front and rear face plates 14 and 16. In embodiments, supporting the cylinder extension walls 6-8 and 18-20 further includes inserting tabs of the cylinder extension walls 6-8 and 18-20 into corresponding openings in the front and rear face plates 14 and 16. For example, a first set of tabs 28 of the cylinder extension wall 8 into corresponding openings 54-56 located at the first upper arm portion 10 of the front face plate 14. A similar step can be implemented with respect to the cylinder extension wall 20 so as to result in a structure, as shown in FIG. 3. For example, at 200, a first set of tabs 32 of the cylinder extension wall 20 can be inserted into corresponding openings 58-60 located at the second upper portion 22 of the front face plate 14. At 300, as shown in FIG. 3, a first set of the tabs 30 of the cylinder extension wall 18 can be inserted into corresponding openings 62-64 located at the second upper portion 22 of the front face plate 14. At 400, a first set of the tabs 26 of the cylinder extension wall 6 can be inserted into corresponding openings 66-68 located at the first upper arm portion 10 of the front face plate 14, so as to result in a structure, as shown in FIG. 4.

Figure 5:
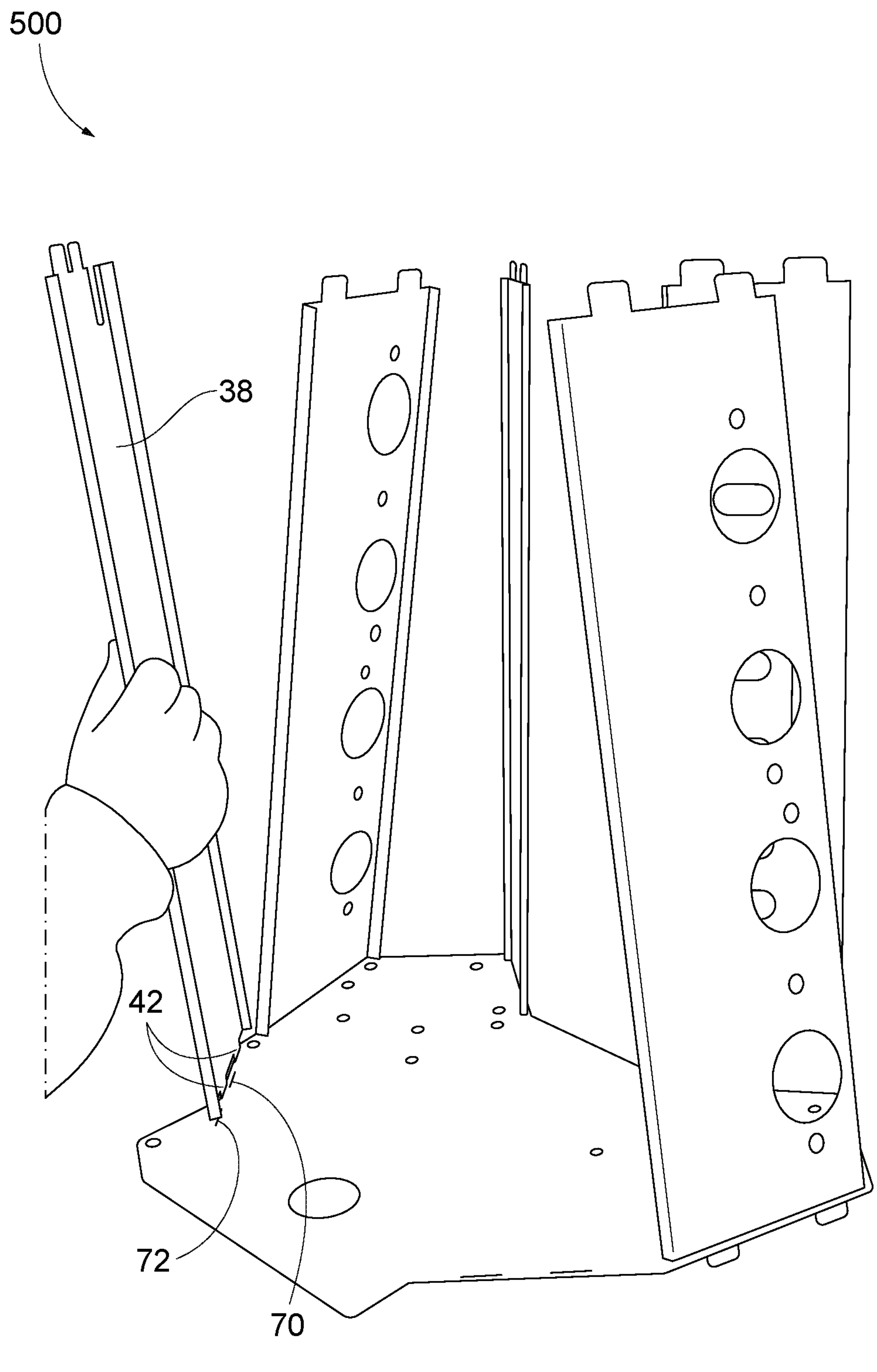
FIG. 5 illustrates a fourth step of the method of assembling the mockup engine block of FIG. 1, according to one or more embodiments.
Figure 6:
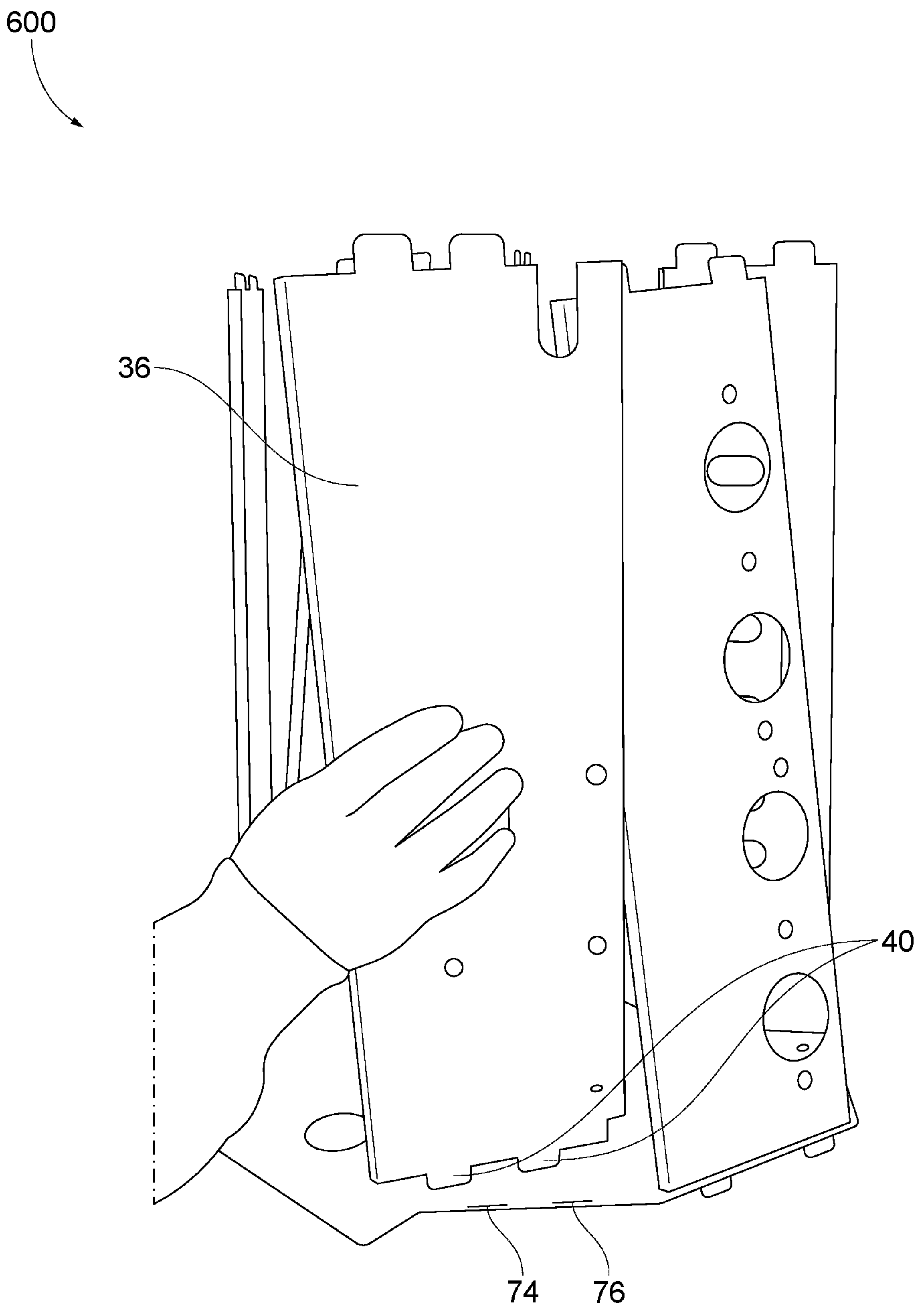
FIG. 6 illustrates a fifth step of the method of assembling the mockup engine block of FIG. 1, according to one or more embodiments.

The method may also include supporting the first motor mount extension 36 and the second motor mount extension 38 between the front and rear face plates 14 and 16. In embodiments, supporting the motor mount extension 36 and 38 further includes a first and second set of tabs of each of motor mount extension 36 and 38 into corresponding openings in the front and rear face plates 14 and 16. For example, at 500, as shown in FIG. 5, a first set of the tabs 42 of the motor mount extension 38 can be inserted into corresponding openings 70-72 of the front face plate 14. At 600, as shown in FIG. 6, a first set of the tabs 40 of the motor mount extension 36 can be inserted into corresponding openings 74-76 of the front face plate 14.

Figure 7:
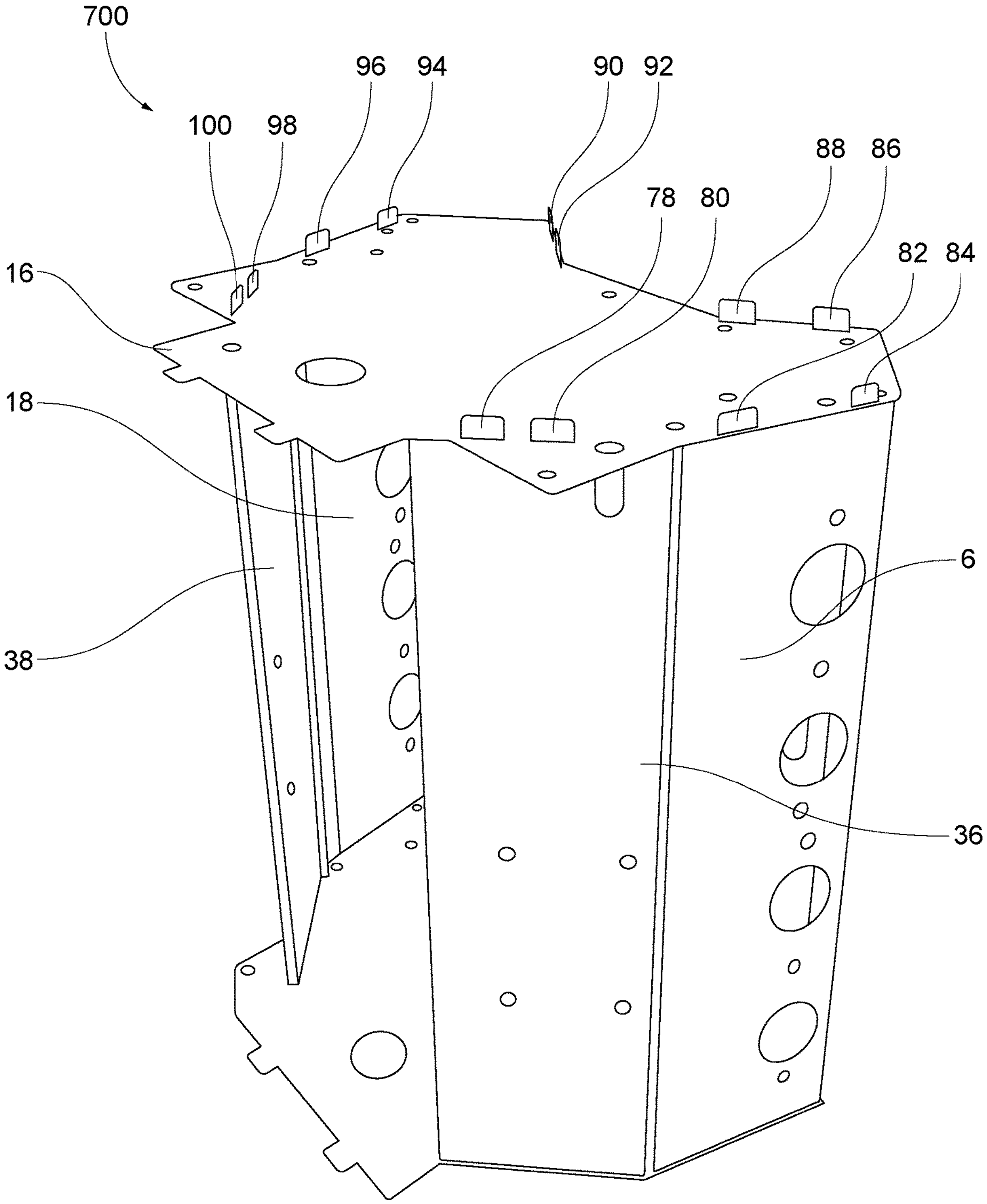
FIG. 7 illustrates a sixth step of the method of assembling the mockup engine block of FIG. 1, according to one or more embodiments.
Figure 8:
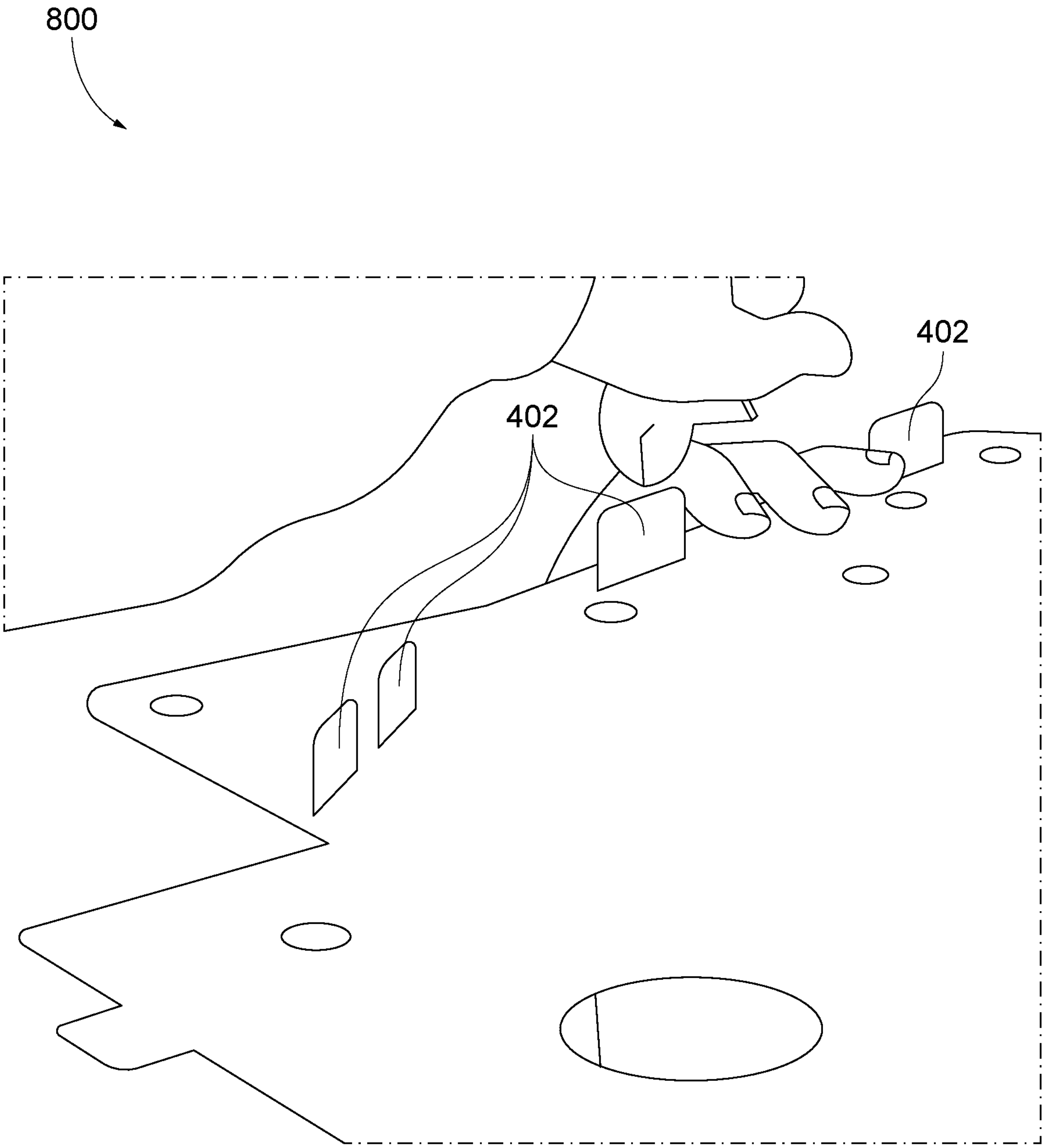
FIG. 8 illustrates a seventh step of the method of assembling the mockup engine block of FIG. 1, according to one or more embodiments.
Figure 9:
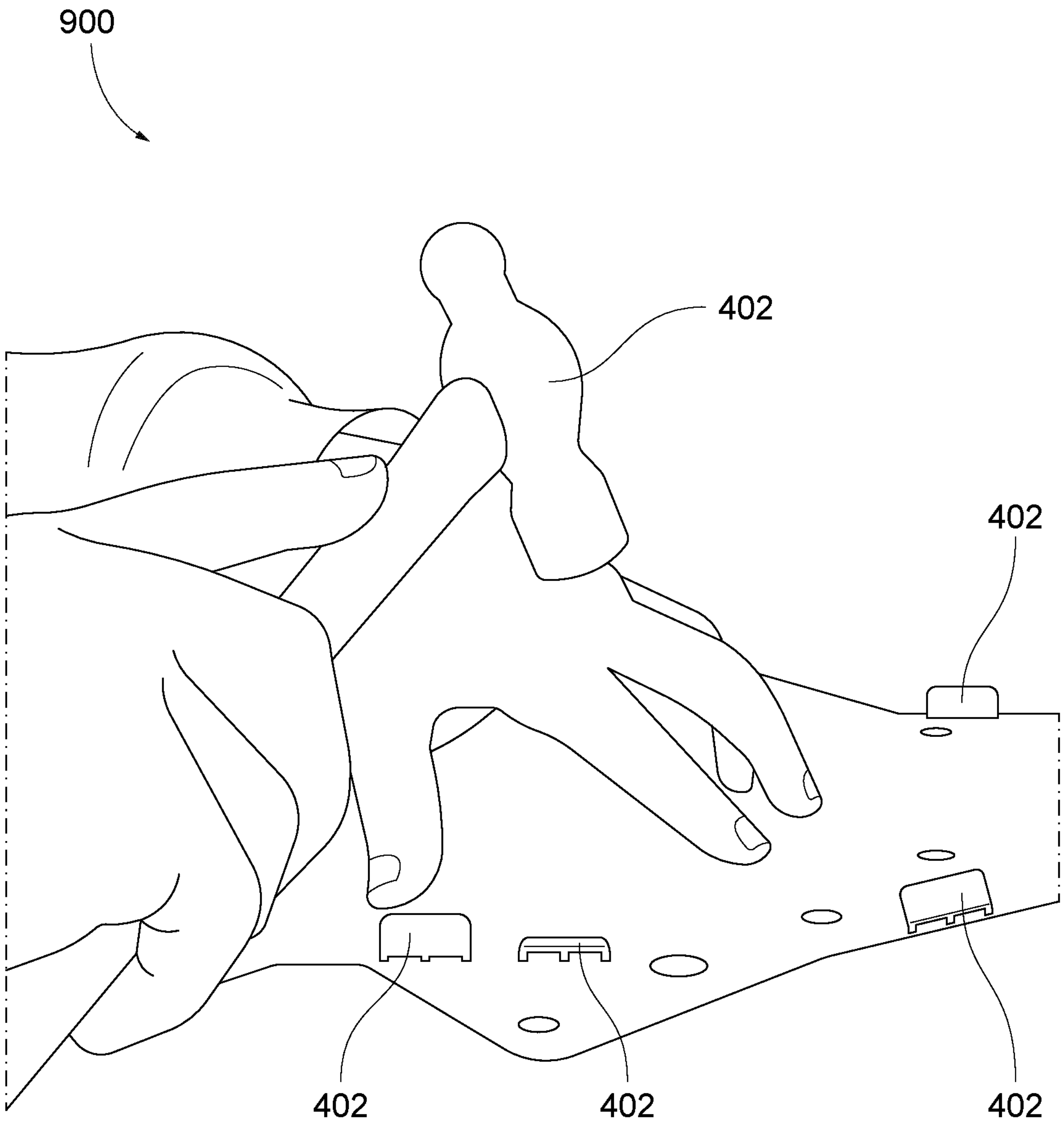
FIG. 9 illustrates a eighth step of the method of assembling the mockup engine block of FIG. 1, according to one or more embodiments.

The method further includes, at 700, as shown in FIG. 7, positioning of the rear face plate 16 with respect to a structure, as shown in FIG. 8, so that remaining tabs of the tabs 26, 28, 30, 32, 40, 42 are extended through corresponding openings 78-100 of the rear face plate 16. At 800, as shown in FIG. 8, a tool (e.g., a wrench, or a different tool) can be used to bend the remaining tabs of the tabs 26, 28, 30, 32, 40, 42 inward toward a center of the rear face plate 16. At 900, as shown in FIG. 9, each of the bent tabs can be hammered (e.g., by a hammer, as shown in FIG. 9, or with a different tool) so that a bent portion of the remaining tabs of the tabs 26, 28, 30, 32, 40, 42 lays perpendicular with respect to a surface of the rear face plate 16, or on the surface of the rear face plate 16. In some examples, a bending and hammering of a tab once positioned through an opening can correspond to locking the tab, which can secure one of a plate, cylinder extension wall, and motor mount extension to a corresponding plate, cylinder extension wall, or motor mount extension.

Figure 10:
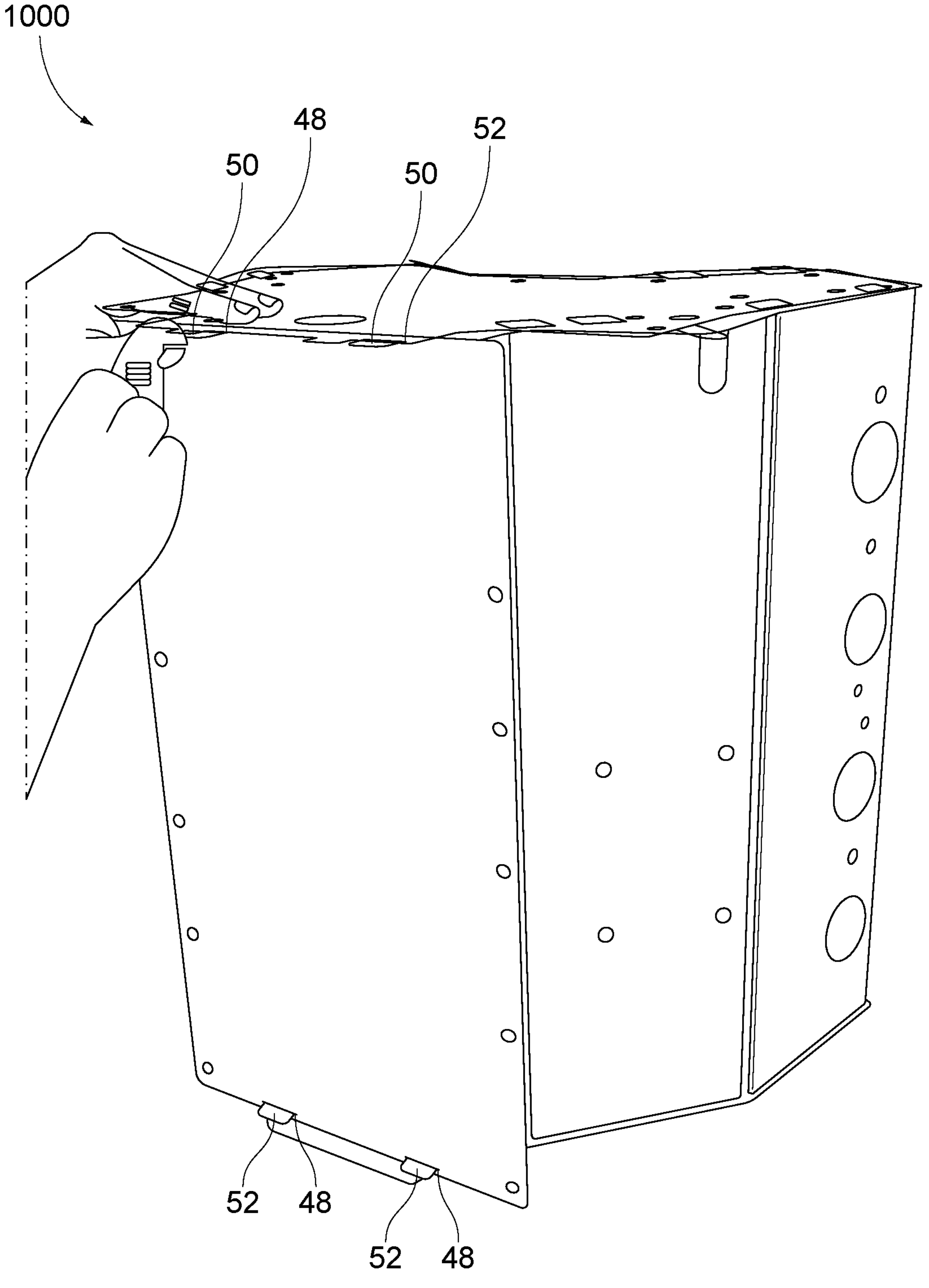
FIG. 10 illustrates a ninth step of the method of assembling the mockup engine block of FIG. 1, according to one or more embodiments.
Figure 11:
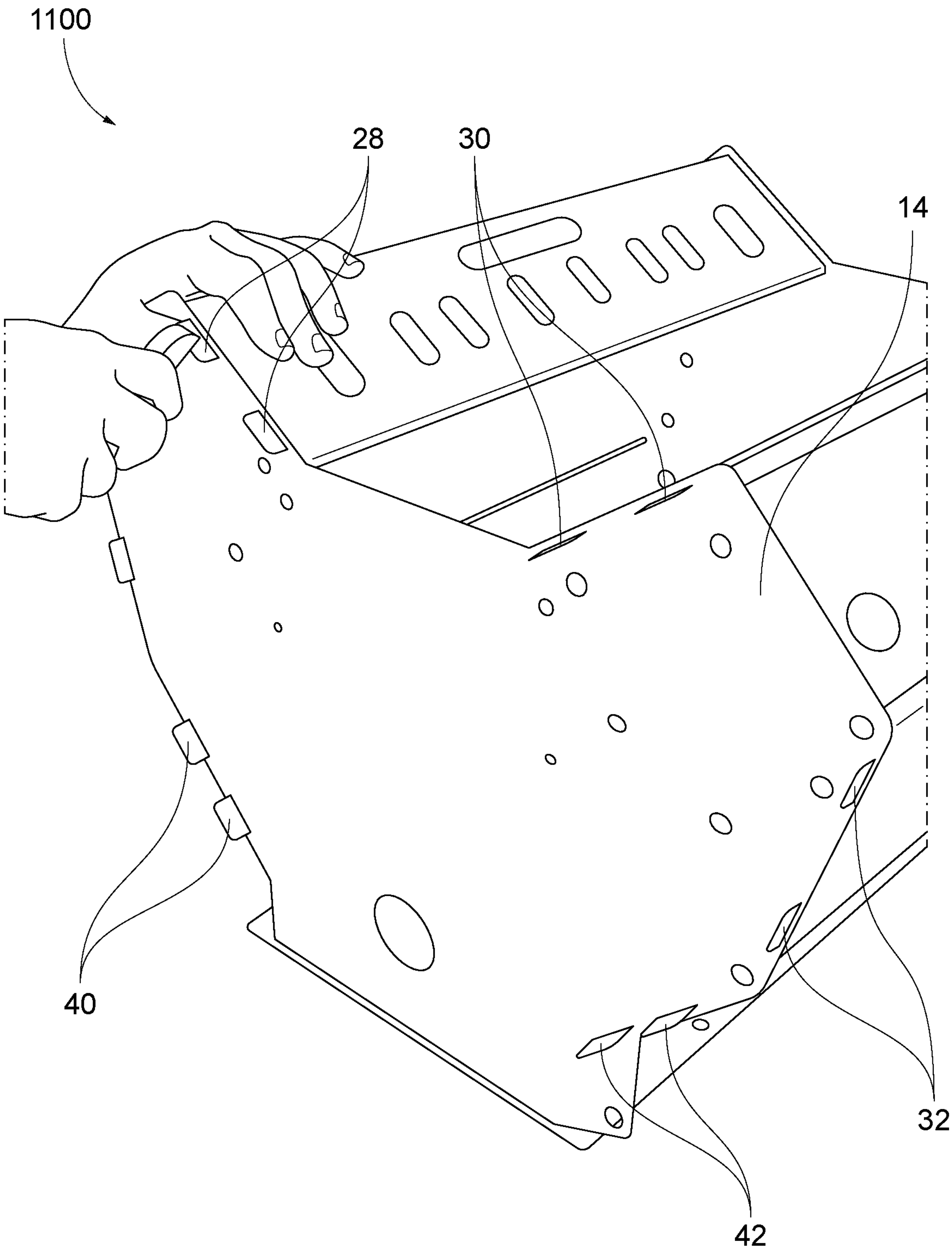
FIG. 11 illustrates a tenth step of the method of assembling the mockup engine block of FIG. 1, according to one or more embodiments.

Continuing with the method, at 1000, the bottom face plate 44 can be positioned relative to the front and rear face plates 14-16 and supported there-between. In embodiments, the tabs 50 of the front face plate 14 and the tabs 52 of the rear face plate 16 extend through one of the openings 48 of the bottom face plate 44, so as to result in a structure, as shown in FIG. 10. In some examples, at 1000, as shown in FIG. 10, the tool can be used to bend the tabs 50-52 inward toward a center of the bottom face plate 44. At 1100, similar steps can be repeated with respect to the tabs 26, 28, 30, 32, 40, 42, as described herein with respect to FIGS. 8-9, so that the tabs 26, 28, 30, 32, 40, 42 are bent inward toward a center of the front face plate 14 and hammered to lay perpendicular to a surface of the front face plate 14, so as to result in the mockup engine block 1, as shown in FIG. 1.

FIG. 12 is an example of a mockup engine block in a dissembled state and can be referred to herein as a dissembled mock engine block 1200. The dissembled mockup engine block 1200 can be packaged in a carton 1202 (e.g., a box), as shown in FIG. 1. The carton 1202 in the example of FIG. 12 is shown without carrying handles, however, in other examples can include carrying handles. Furthermore, in other examples, a bag can be used instead of the carton 1202 for packaging, or any other type of packaging container that provides a container for carrying and/or transporting the dissembled mockup engine block 1200. According to the examples described herein (e.g., with respect to FIGS. 2-11), the dissembled mockup engine block 1200 can be assembled to provide the mockup engine block 1, as shown in FIG. 1.

The terminology used herein is for the purpose of describing particular embodiments only and is not intended to limit this disclosure. As used herein, the singular forms "a." "an." and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. Also, the phraseology and terminology used herein is for the purpose of description and should not be regarded as limiting. The use of "including," "comprising," "having," "containing," "involving," and variations thereof herein, is meant to encompass items listed thereafter and equivalents thereof as well as additional items. While the disclosure has described several exemplary embodiments, it will be understood by those skilled in the art that various changes can be made, and equivalents can be substituted for elements thereof, without departing from the spirit and scope of the invention.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. While the present disclosure has been described with respect to a number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A method of assembling a mockup engine block comprising:
- supporting a first set of cylinder extension walls between a first face plate and a second face plate;
- supporting a second set of cylinder extension walls between the first face plate and the second face plate;
- locking the first set of cylinder extension walls and the second set of cylinder extension walls relative to the first face plate and the second face plate;
- supporting a first motor mount extension between the first face plate and the second face plate; and
- supporting a second motor mount extension between the first face plate and the second face plate.

2. The method of claim 1, wherein:
- supporting the first set of cylinder extension walls between the first face plate and the second face plate further comprises:
  - inserting a first set of tabs of the first set of cylinder extension walls through a first set of openings of the first face plate, and
  - inserting a second set of tabs of the first set of cylinder extension walls through a first set of openings of the second face plate; and
- supporting the second set of cylinder extension walls between the first face plate and the second face plate further comprises:
  - inserting a first set of tabs of the second set of cylinder extension walls through a second set of openings of the first face plate, and
  - inserting a second set of tabs of the second set of cylinder extension walls through a second set of openings of the second face plate.

3. The method of claim 2, further comprising:
- locking the first and second sets of tabs of the first and second sets of cylinder extension walls, once inserted into corresponding openings of the first and second face plates, respectively, to form first and second cylinder heads of the mock engine block.

4. The method of claim 3, wherein the locking of the first and second set of tabs comprises:
- bending the first and second set of tabs, and
- hammering the first and second set of tabs once bent to contact a surface of a respective one of the first and second face plates.

5. The method of claim 1, wherein:
- supporting the first motor mount extension between the first face plate and the second face plate further comprises:
  - inserting a first set of tabs of the first motor mount extension through a first set of openings of the first face plate, and
  - inserting a second set of tabs of the first motor mount extension through a first set of openings of the second face plate; and
- supporting the second motor mount extension between the first face plate and the second face plate further comprises:
  - inserting a first set of tabs of the second motor mount extension through a second set of openings of the first face plate, and
  - inserting a second set of tabs of the second motor mount extension through a second set of openings of the second face plate.

6. The method of claim 5, further comprising:
- locking the respective tabs of the motor mount extensions once inserted into respective openings of the first and second face plates, respectively.

7. The method of claim 6, wherein the locking of the respective tabs of the motor mount extensions comprises:
- bending the respective tabs, and
- hammering the respective tabs once bent to contact a surface of the respective one of the first and second face plates.

8. The method of claim 1, further comprising:
- supporting a bottom face plate between the first and second face plates to assembly the mockup engine block.

9. The method of claim 8, wherein the supporting the bottom face plate between the first and second face plates comprises:
- positioning the bottom face plate relative to the first and second face plates so that tabs of the first and second face plates extend through a respective opening of the bottom face plate, and
- locking the tabs of the first and second face plates once the tabs are inserted into the respective openings of the bottom face plate, wherein the locking the tabs of the first and second face plates further comprises:
  - bending the tabs of the first and second face plates and;
  - hammering the tabs of the first and second face plates once bent to contact a surface of the bottom face plate.

10. A mockup engine block assembly kit, the kit comprising:
- a first set of cylinder extension walls;
- a second set of cylinder extension walls;
- first and second face plates, wherein the first and second set of cylinder extension walls are configured to be supported between the first and second face plates to form respective first and second cylinder heads; and
- a set of motor mount extensions configured to be supported between the first and second face plates,
- wherein the first and second face plates each have an inner facing surface, and the first and second set of cylinder extension walls extend between the inner facing surfaces.

11. The kit of claim 10, wherein the first and second face plates have a first set of openings for receiving a respective tab of the first and second set of cylinder extension walls.

12. The kit of claim 11, wherein each motor mount extension of the set of motor mount extensions comprises tabs at respective ends, the first and second face plates comprising a second set of openings for receiving a respective tab of the tabs of each motor mount extension.

13. The kit of claim 12, further comprising a bottom face plate configured to be supported between the first and second face plates, wherein the bottom face plate comprises openings for receiving a respective tab from each of the first and second face plates.

14. The kit of claim 10, wherein the first and second set of cylinder extension walls are secured to and supported by the first and second face plates.

15. The kit of claim 10, wherein the first and second set of cylinder extension walls are directly connected to the first and second face plates.

16. A mockup engine block comprising:

a first set of cylinder extension walls with tabs on respective ends that extend into a first set of openings of first and second face plates, respectively;

a second set of cylinder extension walls with tabs on respective ends that extend into a second set of openings of the first and second face plates, respectively, wherein a portion of the tabs of the first and second set of cylinder extension walls is perpendicular and contacting a surface of one of the first and second face plates;

a set of motor mount extensions with tabs on respective ends that extend into a third set of openings of the first and second face plates, respectively, wherein a portion of the tabs of the set of motor mount is perpendicular and contacting the surface of one of the first and second face plates; and a bottom face plate secured to the first and second face plates.

17. The mockup engine block of claim 16, wherein each of the first and second face plates comprises a set of tabs, each set of tabs of the first and second face plates extending into a corresponding opening of the bottom face plate, and wherein a portion of the tabs of the first and second face plates is perpendicular and contacting a surface of the bottom face plate.

18. A mockup engine block assembly kit, the kit comprising:

a first set of cylinder extension walls;

a second set of cylinder extension walls;

first and second face plates, wherein the first and second set of cylinder extension walls are configured to be supported between the first and second face plates to form respective first and second cylinder heads; and a set of motor mount extensions configured to be supported between the first and second face plates, wherein the first and second face plates have a first set of openings for receiving a respective tab of the first and second sets of cylinder extension walls.

19. The kit of claim 18, wherein each motor mount extension of the set of motor mount extensions comprises tabs at respective ends, the first and second face plates comprising a second set of openings for receiving a respective tab of the tabs of each motor mount extension.

20. The kit of claim 18, further comprising a bottom face plate configured to be supported between the first and second face plates.

21. The kit of claim 20, wherein the bottom face plate comprises openings for receiving a respective tab from each of the first and second face plates.

22. The kit of claim 18, wherein the first and second set of cylinder extension walls are secured to and supported by the first and second face plates.

23. The kit of claim 18, wherein the first and second set of cylinder extension walls are directly connected to the first and second face plates.

* * * * *